(12) United States Patent
Pedersen et al.

(10) Patent No.: US 10,227,821 B2
(45) Date of Patent: Mar. 12, 2019

(54) ELECTRICALLY AND MANUALLY ADJUSTABLE SCREENING DEVICE AND METHOD FOR SCREENING A WINDOW

(71) Applicant: VKR HOLDING A/S, Horsholm (DK)

(72) Inventors: Rasmus Klercke Pedersen, Bryrup (DK); Karsten Engholm Rasmussen, Herning (DK); Jan Thomsen, Ringkobing (DK)

(73) Assignee: VKR Holding A/S, Horsholm (DK)

( * ) Notice: Subject to any disclaimer, the term of this patent is extended or adjusted under 35 U.S.C. 154(b) by 108 days.

(21) Appl. No.: 15/352,126

(22) Filed: Nov. 15, 2016

(65) Prior Publication Data

US 2017/0167192 A1 Jun. 15, 2017

(30) Foreign Application Priority Data

Dec. 15, 2015 (EP) ..................................... 15200107

(51) Int. Cl.
| | |
|---|---|
| *E06B 9/72* | (2006.01) |
| *E06B 9/58* | (2006.01) |
| *E06B 9/62* | (2006.01) |
| *E06B 9/68* | (2006.01) |
| *E06B 9/74* | (2006.01) |
| *H02P 7/00* | (2016.01) |

(52) U.S. Cl.
CPC .................. *E06B 9/72* (2013.01); *E06B 9/58* (2013.01); *E06B 9/62* (2013.01); *E06B 9/68* (2013.01);
(Continued)

(58) Field of Classification Search
CPC ... E06B 9/322; E06B 9/72; E06B 9/68; E06B 2009/6818; E06B 2009/6809;
(Continued)

(56) References Cited

U.S. PATENT DOCUMENTS 5,848,634 A * 12/1998 Will ........................ E06B 9/174
160/310
8,125,167 B1 2/2012 Mullet et al.
(Continued)

FOREIGN PATENT DOCUMENTS

EP 1039092 A2 * 9/2000 ............. E06B 9/262
WO 2014172493 A1 10/2014

OTHER PUBLICATIONS

Extended European Search Report for European Application EP 15200107.9, dated Jul. 7, 2016, 9 pages.

*Primary Examiner* — Beth A Stephan
(74) *Attorney, Agent, or Firm* — Kilpatrick Townsend & Stockton LLP; Dean W. Russell; Melissa L. Love

(57) ABSTRACT

An electrically and manually adjustable screening device for screening a window. The screening device has a screen with a variable length and a positionable free end. The longitudinal position of the free end determines the length of the screen. An electric drive is operably connected to the screen for adjusting the longitudinal position of said free end. A sensor arrangement is configured to detect manual movement of the longitudinal position of the free end and for outputting a detection signal. A circuit or processor is configured to control the speed of the electric drive and is configured to ramp up the speed of the electric drive in response to a detected manual movement starting the ramp up at a speed similar to the speed of the detected movement to gradually take over from the manual movement.

20 Claims, 6 Drawing Sheets

(52) U.S. Cl.
CPC ........ *E06B 9/74* (2013.01); *E06B 2009/6818* (2013.01); *H02P 7/00* (2013.01)

(58) Field of Classification Search
CPC ...... E06B 2009/6845; E06B 9/74; E06B 9/62; E06B 9/58; E06B 9/262; E06B 9/34; E06B 9/42
USPC ............................................ 160/168.1 P, 305
See application file for complete search history.

(56) References Cited

U.S. PATENT DOCUMENTS

| | | | | |
|---|---|---|---|---|
| 8,947,027 | B2* | 2/2015 | Mullet | H02P 3/08 |
| | | | | 318/255 |
| 9,644,424 | B2* | 5/2017 | Slivka | E06B 9/72 |
| 2010/0122780 | A1* | 5/2010 | Cheng | E06B 9/42 |
| | | | | 160/305 |
| 2012/0048481 | A1 | 3/2012 | Feldstein et al. | |
| 2013/0025803 | A1* | 1/2013 | Eiterman | G01M 99/008 |
| | | | | 160/305 |
| 2013/0199735 | A1* | 8/2013 | Colson | E06B 9/42 |
| | | | | 160/2 |
| 2013/0255890 | A1* | 10/2013 | Mullet | E06B 9/307 |
| | | | | 160/168.1 P |
| 2014/0216666 | A1* | 8/2014 | Smith | E06B 9/38 |
| | | | | 160/84.04 |
| 2014/0224437 | A1* | 8/2014 | Colson | E06B 9/42 |
| | | | | 160/291 |
| 2015/0226001 | A1* | 8/2015 | Adams | E06B 9/72 |
| | | | | 160/84.02 |

* cited by examiner

ELECTRICALLY AND MANUALLY ADJUSTABLE SCREENING DEVICE AND METHOD FOR SCREENING A WINDOW

CROSS-REFERENCE TO RELATED APPLICATION

The present application claims priority from European Patent Application No. 15200107.9 filed on Dec. 15, 2015, the entirety of which is hereby incorporated by reference into this application.

TECHNICAL FIELD

This disclosure relates to an electrically and manually adjustable screening device, e.g. a shade, for screening a window, and to a method for manual and motorized manipulation of a screening device, e.g. a shade, and more particularly, the disclosure relates to a screening device and method where a screen with an adjustable length in which the position of the free end of the screen can be manipulated with an electric drive. Even more particularly, the disclosure relates to an electrically and manually adjustable screening device and method in which the action of a user is sensed and followed up by an electric drive.

BACKGROUND

WO14172493 discloses a window covering that can be manually moved as well as moved by way of motorized manipulation and has three modes depending on the type of tug, defined as a small movement of the covering. Type (i), micro tug, sends shade up to next pre-set position; type (ii), short tug, sends shade up to upper limit; and type (iii), long tug, where the shade remains in the position it was pulled to.

U.S. Pat. No. 8,125,167 discloses a motorized shade where the electric drive is activated to move the shade, if the operator's manual movement of the shade does not exceed a certain threshold. Otherwise, the shade just moves like a slave according to the operator's manual movement.

In these known devices and methods, the take over from the manual movement is not always experienced by users as pleasant to operate because the electric drive takes over from the operator abruptly, resulting in sudden changes in speed. Such sudden changes in speed can undermine user confidence in the product and are generally regarded as unpleasant and not intuitive.

SUMMARY

It is an object to provide an electrically and manually adjustable screening device for screening a window that overcomes or at least reduces the drawbacks mentioned above.

This object is achieved according to a first aspect, by providing an electrically and manually adjustable screening device for screening a window, the screening device comprising: a screen with a variable length and with a positionable free end, the longitudinal position of the free end determining the length of the screen, an electric drive operably connected to the screen for adjusting the longitudinal position of the free end, a sensor arrangement configured for detecting manual movement of the longitudinal position of the free end and outputting a detection signal, a circuit or processor configured to control the speed of the electric drive between zero and an electric drive maximum or service speed, the circuit or processor being operably connected to the sensor arrangement and in receipt of the detection signal, and the circuit or processor being configured to ramp up the speed of the electric drive in response to a detected manual movement with the ramp up starting at a speed above zero and below the maximum or service speed in order to achieve a smooth take over from the manual movement.

By ramping up the speed of the electric drive from a speed above zero and below the maximum or service speed of the electric drive, the starting speed is closer to the speed of the manual movement. Thus, abrupt changes in the speed of the free end that can be experienced by an operator as unpleasant can be avoided. Thus, the operator will experience a pleasant and smooth takeover by the electric drive that is experienced as intuitive.

In a first possible implementation form of the first aspect, the circuit or processor is configured to stop the drive after the ramp-up when either reaching a pre-programmed position or detecting resistance exceeding a threshold.

In a second possible implementation form of the first aspect, the pre-programmed position is an end position.

In a third possible implementation form of the first aspect, the circuit or processor is configured to gradually ramp up the drive speed starting at a speed well below the drive maximum speed, preferably at substantially 10 to 20% of a drive maximum speed. Start-up speeds for the ramp at too low levels are not experienced as agreeable by operators due to the deceleration of the free end at the moment of takeover. Start-up speeds of the ramp close to the drive maximum speed lead to strong acceleration at the moment of takeover, which may not be experienced as agreeable by operators.

In a fourth possible implementation form of the first aspect, the circuit or processor is configured to gradually ramp up the drive speed starting from substantially the same speed as a detected speed of the manual movement. Thus, the changes in speed at the moment of taking over the manual movement by the electric drive can be minimized or even avoided.

In a fifth possible implementation form of the first aspect, the circuit or processor is configured to minimize the speed change of the free end during the takeover from the manual movement. Thus, the transition at the takeover can be completely free from changes in speed and changes in acceleration so that a completely smooth takeover profile is achieved.

In a sixth possible implementation form of the first aspect, the sensor arrangement preferably comprises one of an encoder, a tachometer or an inductor.

In a seventh possible implementation form of the first aspect, the circuit or processor is configured to detect resistance by detecting a drop in the drive speed.

In an eighth possible implementation form of the first aspect, the circuit or processor is configured to detect resistance by detecting an increase of electrical current used by the electric drive.

In a ninth possible implementation form of the first aspect, the electric drive comprises an electric motor.

In a tenth possible implementation form of the first aspect, the electric drive comprises a reduction gear operably coupled to the electric motor, the reduction gear having a ratio between 5:1 and 40:1, preferably between 10:1 and 20:1.

A low reduction ratio compared to known screening devices that typically have reduction ratios between 300:1 and 500:1 renders the free end light to move by hand, thus further improving the operator experience when manually initiating a moment.

In an eleventh possible implementation form of the first aspect, the screening arrangement further comprises an arrangement for storing and releasing potential energy for at least partially compensating for changes in potential energy of the screen caused by movement of the screen in the gravitational field.

In a twelfth possible implementation form of the first aspect, the arrangement for storing and releasing potential energy comprises a resilient element and/or a counterweight forced to move in the gravitational field in a direction opposite to the movement of the free end.

The object above is also achieved according to a second aspect by providing a method for operating electrically and manually adjustable screening device for screening a window, the screening device comprising a screen with a variable length and with a positionable free end, the longitudinal position of the free end determining the length of the screen, an electric drive operably connected to the screen for adjusting the longitudinal position of the free end between zero and an electric drive maximum or service speed, the method comprising: detecting a manual movement of the longitudinal position of the screen, and outputting a detection signal, upon detecting manual movement operating the electric drive to smoothly take over from the manual movement in response to the detected manual movement, and ramping up the speed of the electric motor from a portion of a drive maximum speed to the drive maximum speed with the ramp up starting at a speed above zero and below the maximum or service speed.

The foregoing and other objects are achieved by the features of the independent claims. Further implementation forms are apparent from the dependent claims, the detailed description and the figures.

BRIEF DESCRIPTION OF THE DRAWINGS

In the following detailed portion of the present disclosure, the aspects and possible implementations will be explained in more detail with reference to the example embodiments shown in the drawings, in which.

DETAILED DESCRIPTION

Figure 1:
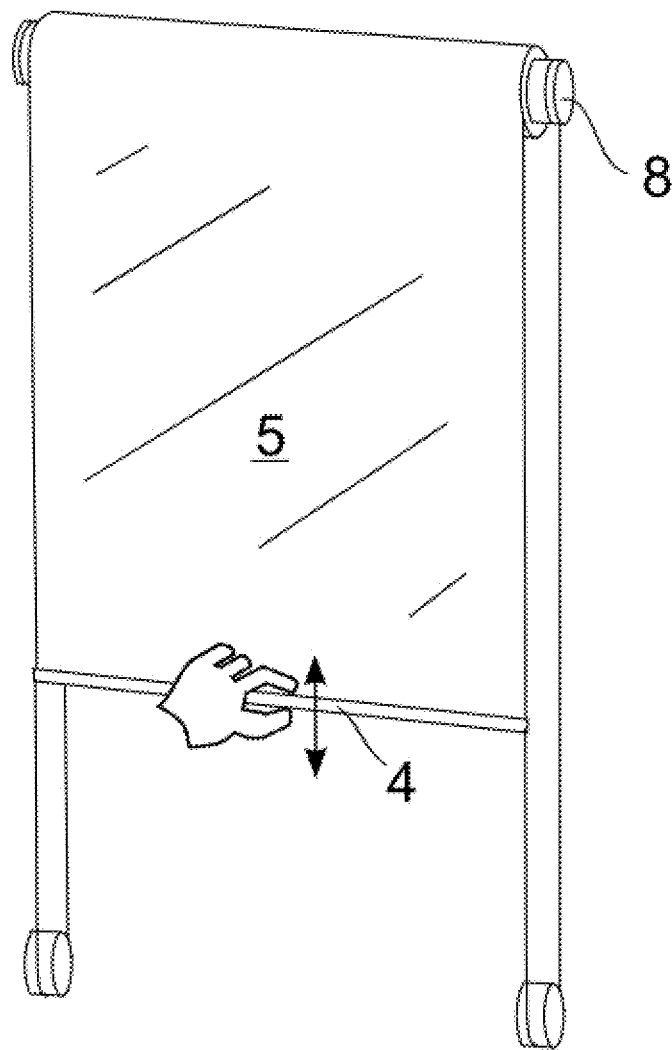
FIG. 1 illustrates an example embodiment of a screening arrangement with spring-loaded pulleys and cords.
Figure 2:
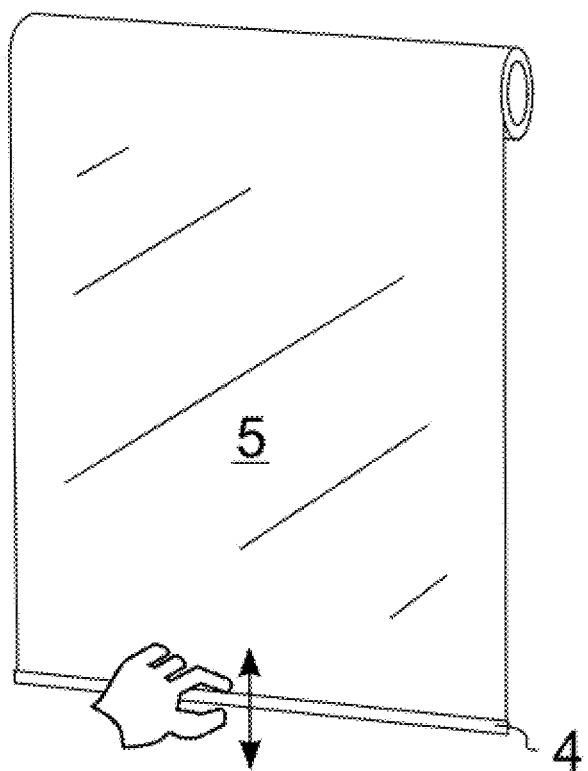
FIG. 2 illustrates another example embodiment in the form of a roller shade.
Figure 3:
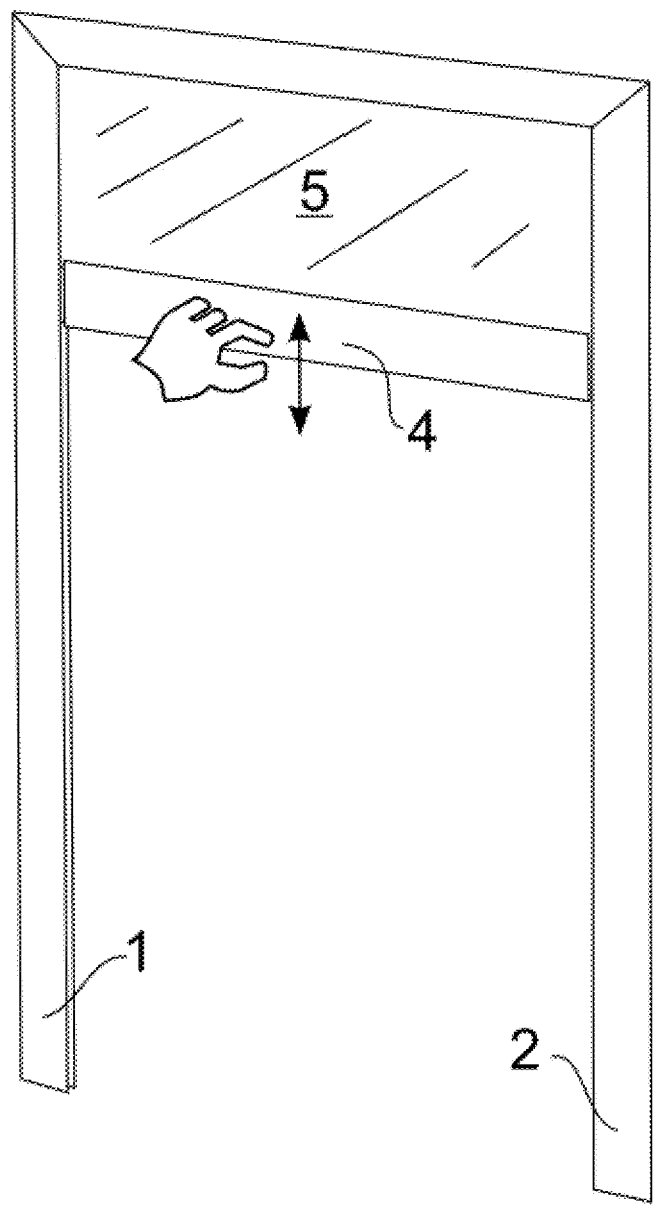
FIG. 3 illustrates another example embodiment in the form of a roller shade with guide rails.

FIGS. 1 to 3 show embodiments of an electrically and manually adjustable screening device, i.e. a shade, for screening a window, such as a window with a rectangular outline (not shown). The window can e.g. be a façade window, a roof window or a skylight. The shown screening device comprises a screen 5 and a bottom element in the form of a free end 4. The screen can e.g. be made from cloth or fabric material or from other suitable sheet material.

The screen 5 is suspended from a top element and has a variable length, a fixed width between two edges of the screen 5 and a positionable free end 4. The longitudinal position of the free end 4 determines the length of the screen 5 (the longitudinal direction being parallel with the edges of the screen 5). When the screening device is placed in front of a window, the longitudinal position of the free end 4 determines to which extent the window is covered.

The position of the free end 4 can be adjusted by an electric drive connected to the screen 5. The electric drive may in principle be arranged anywhere on the screening device, such as particularly in or at either the free end 4 or in or at the top of the screen 5. The electric drive may e.g. include an electric drive motor coupled to a reduction gear arranged inside a winding shaft arranged at the top end on which the screen 5 can be rolled up and configured to rotate the roller for winding or unwinding the screen 5, as shown in FIGS. 1 and 2 or e.g. an electric drive motor coupled to a reduction gear arranged inside the free end 4 and acting with drive wheels on a window frame or side rails of side rails 1,2 as shown in FIG. 3.

In an embodiment, the screening device has a top element in the form of a winding shaft with a cloth or fabric screen 5 at least partially wound around the winding shaft. The screening device is in an embodiment shown in FIG. 1 provided with pulleys and cords 8 that are weight-balanced to at least partially compensate for the force for moving the screen through the gravity field so movement of the screen 5 requires only a small force. Alternatively, as shown in FIG. 2, the winding shaft can be coupled to resilient means, such as a helical spring, in order to compensate for the force for moving the screen through the gravitational field.

The electric drive may comprise an electric motor that is operatively coupled to the winding shaft, e.g. via a reduction gear. The reduction gear preferably has a drive ratio in the range between 5:1 to 40:1, even more preferably in the range between 10:1 and 20:1.

The screening arrangement and/or the electric drive is provided with a sensor to determine the position of the free end 4. The sensor may be an encoder or tachometer or inductor, e.g. a motor drive revolution counter. So the same sensor may detect the motor rotation and the manual movement of the screen. Manual movement is a movement of the free end 4 caused by an operator applying a force to the free end 4 large enough to move the free end 4. However, the electric drive and motor and the screening arrangement can have separate sensors. Furthermore, in the embodiment of FIG. 3, the screening device comprises two side rails 1 and 2 that serve to guide the opposing edges of the screen 5. In this embodiment, the sensor may be arranged in on one of the guide rails.

The top element may include a winding shaft. However, other screening arrangements having other kinds of screening bodies and other configurations of the top element are conceivable as well. Hence, it is noted that as used herein the term "screen" is intended to encompass all feasible types of screens, non-limiting examples being blinds, pleated blinds, venetian blinds, curtains, insect screens, awnings, roller shutters and shades. The screen does not need to be suspended from a winding shaft.

The screening device comprises a processor or circuit for controlling the operation of the screening device. The processor or circuit is in receipt of the signal from the position sensor and the processor or circuit is configured to control the speed of the electric drive, i.e. the processor or circuit comprises a speed controller for controlling the speed of the electric drive. Alternatively, a separate speed controller commanded by the processor may be provided.

In an embodiment, the electric drive is a non-self-locking drive for allowing manual movement/manipulation. In another embodiment, a clutch (or freewheel or sliding coupling) may allow manual movement when a self-locking drive is used.

Preferably, the electric drive operates similar to human movement, i.e. with a speed of the free end of at least 20 cm/sec.

Figure 8:
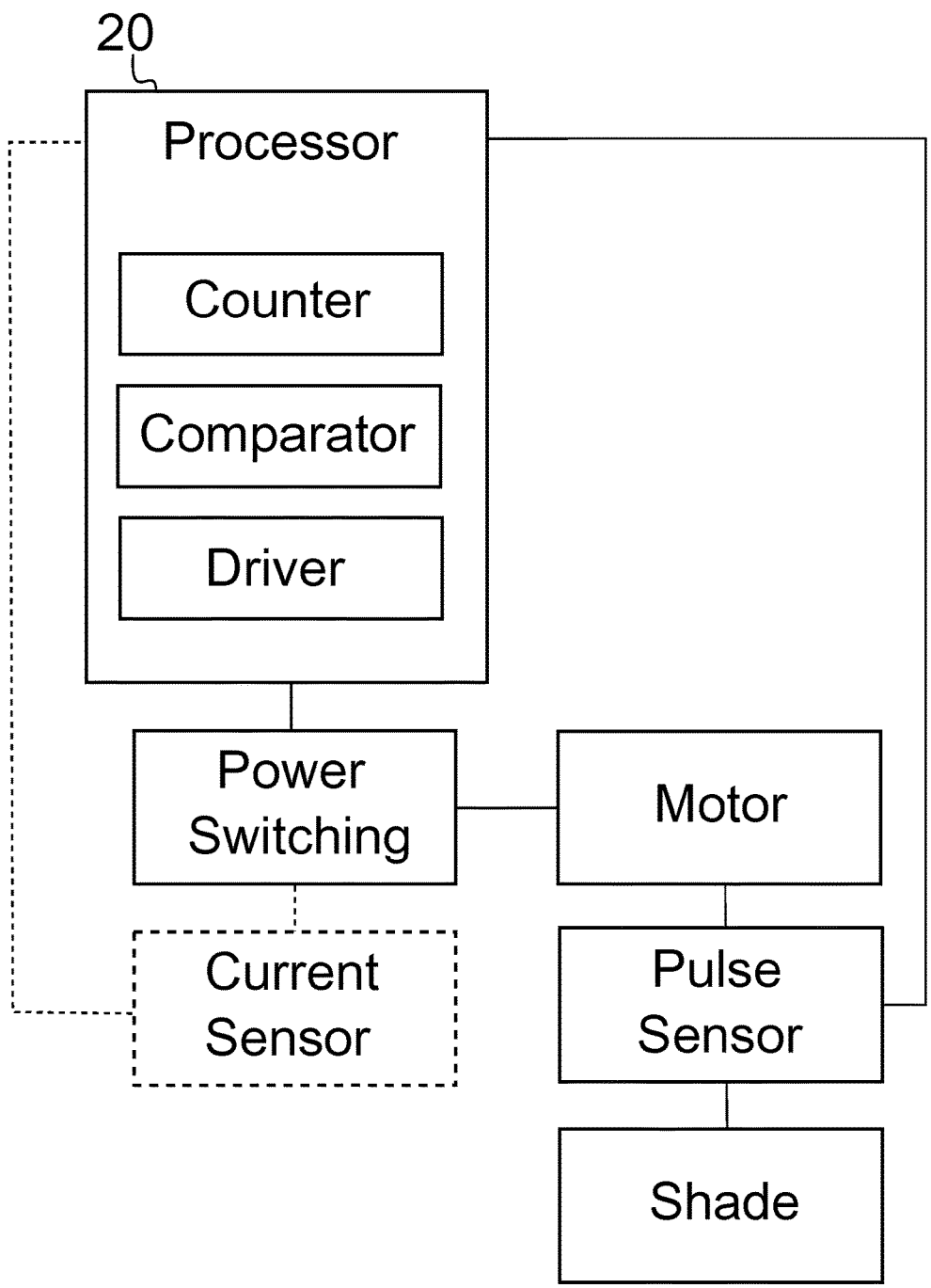
FIG. 8 is a diagram of an example embodiment of the control of a screening arrangement according to the embodiments of FIGS. 1 to 3.

FIG. 8 is a diagram illustrating the concept of the screening device. The screening device is provided with a processor 20 in receipt of a signal from a sensor that is associated with the electric drive motor. The processor 20 comprises a counter, a comparator and a driver in order to form a speed controller for controlling the speed of the electric drive. The processor 20 can be configured to determine the direction of the manually initiated movement. The processor 20 can be configured to operate the electric drive to move the free end 4 in the same direction as the direction of the detected movement when taking over the manual movement m.

The processor 20 is coupled to a power switching unit. The power switching unit provides the electric power for the electric drive motor. In an embodiment, the processor 20 is in receipt of a signal from a current sensor for detecting the electric current delivered by the power switching units to the electric motor. Current sensing is optional and the electric motor and screen 5 may have separate position sensors.

The electric motor can be a DC motor. The speed of the DC motor is controlled by voltage (for example by PWM control) and torque by drain current. The DC motor can be a Brushless motor whose speed is controlled by waveform (frequency) and torque by amplitude of the waveform. The motor speed controller may in an embodiment have a feedback loop monitoring the actual rotation speed and adjusting the motor driver to reach the wished motor speed. The driver controls power switching to adjust dutycycle, waveform, frequency etc. to control the motor speed. Generally, control of speed of the electric motor may use a feedback loop of first order, second order or PID feedback loop.

Figure 4:
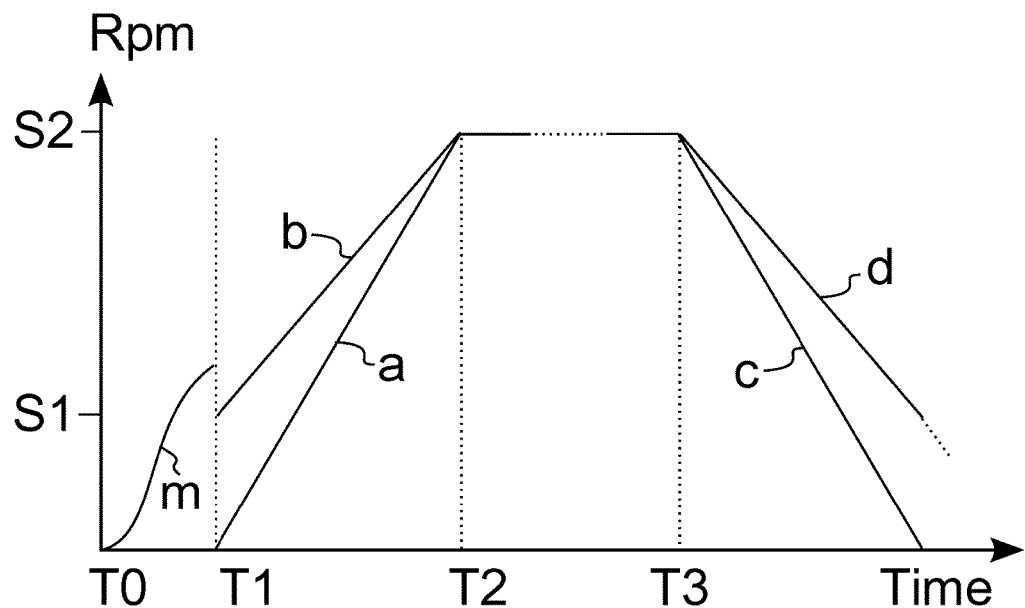
FIG. 4 shows a graph illustrating the speed profile of the free end of the screening arrangement according to any one of FIGS. 1 to 3 during takeover of the manual movement and the following non-manual movement according to an embodiment.

Turning now to FIG. 4, there is shown a graph illustrating the speed of the free end 4 (expressed as RPM detected by the pulse sensor) against time during takeover of a manual movement by the electric drive according to an embodiment. At T0, an operator initiates a manual movement m. The processor 20 detects the manual movement through the signal from the pulse sensor and instructs at T1 for the electric drive to ramp up the speed according to ramp b. The ramp b starts at a level that is well below the maximum or service speed of the electric drive. The level at which the ramp b starts is matched to a typical speed of the manual movement at the moment T1 of taking over by the electric drive.

The speed at which the ramp b starts can be determined from simple trial and error. Typically, a suitable start speed for ramp b is between 10% and 20% of the maximum or service speed of the electric drive. However, this value may differ, depending on the maximum speed of the electric drive, on the operator and on the characteristics of the screen and the mechanism for adjusting the length of the screen.

By starting the ramp at a level well below the maximum or service speed of the electric drive a sudden, and for an operator possibly unpleasant, increase in the speed of the free end is avoided. As shown in FIG. 4, the change in speed of the free end 4 at T1 is relatively small and thus an operator will experience a pleasant takeover of the manual movement without any significant or abrupt changes in speed. Thus, the start of the electric drive is a "soft start".

At T2, the electric drive maximum or service speed has been reached and is maintained until T3. At T3, the free end 4 has reached a preprogrammed position and the processor 20 ramps down the electric drive according to ramp c or d to obtain a "soft stop". The preprogrammed position can be a selective position or an end position, i.e. the top or bottom position of the free end.

For illustration purposes, FIG. 4 also illustrates the ramp-up of the electric motor in response to an electronic control signal, i.e. for a movement that is not initiated manually. In this case, the electric motor is ramp-up from zero in accordance with ramp a.

Figure 5:
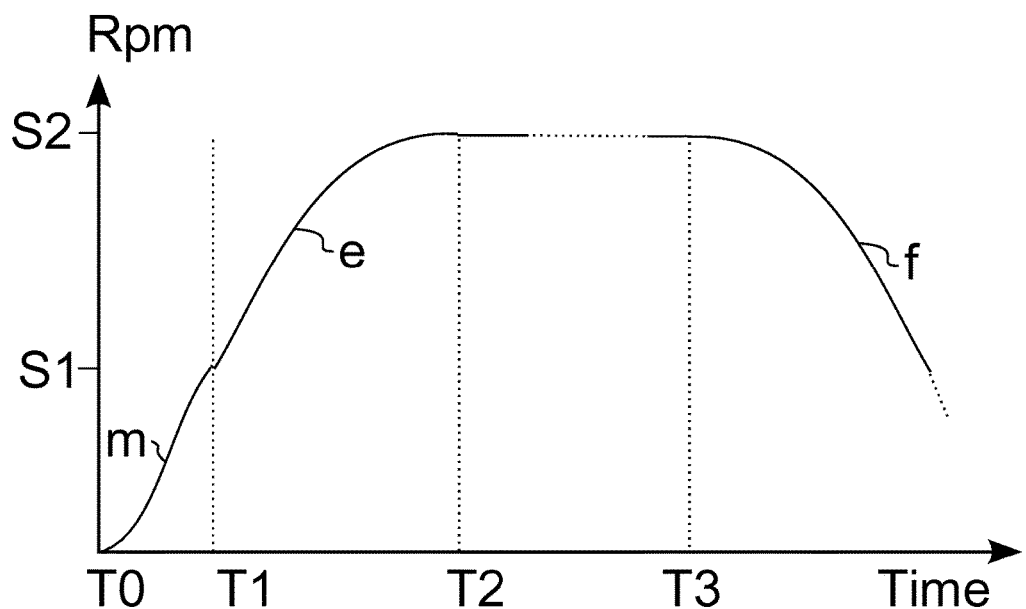
FIG. 5 shows a graph illustrating the speed profile of the free end of the screening arrangement according to any one of FIGS. 1 to 3 during takeover of the manual movement and the following non-manual movement according to another embodiment.

FIG. 5 shows a graph illustrating the speed of the free end 4 (expressed as RPM detected by the pulse sensor) against time during takeover of a manual movement by the electric drive according to another embodiment. Manual movement m is initiated at T0 and, at T1, the processor 20 ramps up the speed of the electric drive in accordance with ramp e. Ramp e is adapted to the manual speed profile by measuring the manual speed at T1 and determining the acceleration at T1, or the acceleration in the period up to T1. The ramp starts at a speed level that is essentially identical to the speed achieved by the manual movement T1. Further, inclination of ramp e at (or just after) T1 is essentially identical to the inclination of the profile of the manual movement m at (or just before) T1. Thus, both the speed and the acceleration of the electric drive at the moment of taking over the movement are essentially identical to the speed and acceleration of the manual movement. Consequently, the operator will experience a completely smooth and non-abrupt taking over of the manual movement.

At T2, the electric drive maximum speed has been reached and is maintained until T3. At T3, the free end 4 has reached a preprogrammed position and the processor 20 ramps down the electric drive according to ramp f to obtain a "soft stop". The preprogrammed position can be a selective position or an end position, i.e. the top or bottom position of the free end.

As shown, ramps e & f need not be linear, but may be controlled by a feedback loop of second order or by PID regulated feedback loop to create the soft transition at T2 and T3.

Figure 6:
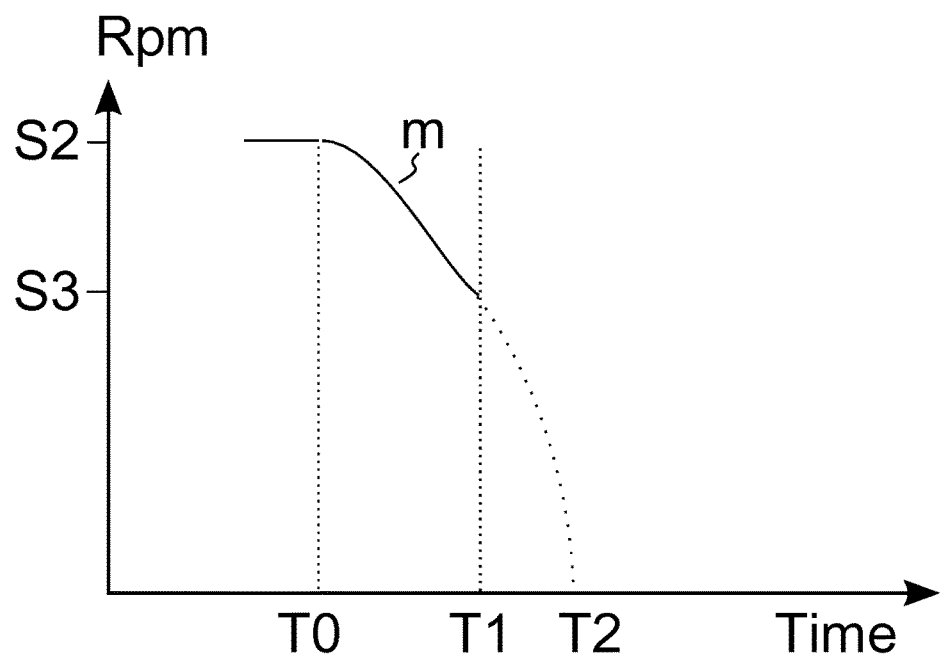
FIG. 6 shows a graph illustrating the speed of a free end or of an electric drive according to the embodiments of FIGS. 1 to 3 when the screening arrangement is manually stopped by an operator at a wished position.

FIG. 6 illustrates a manual stop by an operator at a wished position by applying manual force against the direction of movement starting at T0. The processor 20 reacts to falling rpm between T0 and T1 with a shut off at T1. Without any driving force after T1, the free end comes to a stop at T2.

Figure 7:
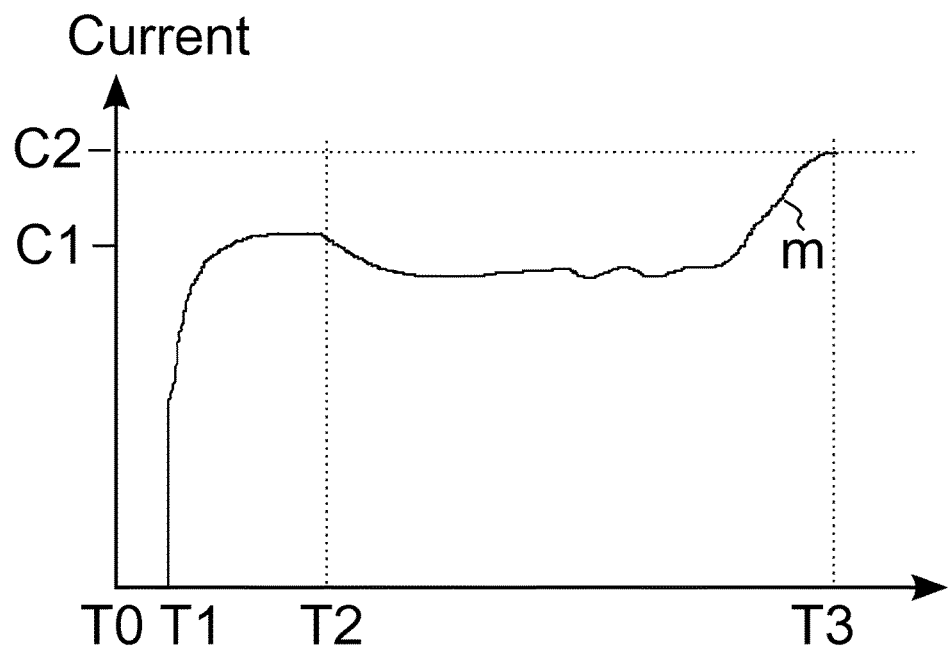
FIG. 7 shows a graph illustrating the motor current when a screening arrangement according to the embodiments of FIGS. 1 to 3 is manually stopped by an operator at a wished position.

FIG. 7 illustrates a manual stop by an operator at a wished position. The processor 20 reacts to rising current (motor draws more current at increasing load) and shuts off current to the electric drive at T3. The threshold for shutting off can be based on a current threshold C2, which is higher than a maximum expected current C1 during normal operation.

A manual stop by an operator may also be sensed by a combination of speed and current signals.

The shown screening devices have a roller blind with a cloth or fabric screen 5. However, other screening arrangements having other kinds of screening bodies and other configurations of the top element are conceivable as well. Hence, it is noted that as used herein the term "screen" is intended to encompass all feasible types of screens, examples being blinds, pleated blinds, venetian blinds, curtains, insect screens, awnings, roller shutters and shades.

The aspects and possible implantations have been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, controller, circuit or other unit may fulfill the functions of several items recited in the claims. The mere fact that certain measures are recited in mutually different dependent claims does not indicate that a combination of these measured cannot be used to advantage.

Generally the maximum speed mentioned is not to be understood in a limited sense as a speed that cannot be exceeded by the electric drive. The maximum speed should be understood as the regular service speed when the electric drive moves the screen and is not in a ramp up or ramp down phase.

The reference signs used in the claims shall not be construed as limiting the scope.

The invention claimed is:

1. An electrically and manually adjustable screening device for screening a
    window, said screening device comprising:
    a screen with a variable length and with a positionable free end, wherein a longitudinal position of said free end determines a length of said screen,
    an electric drive operably connected to said screen for adjusting the longitudinal position of said free end,
    a sensor arrangement configured for detecting manual movement of the longitudinal position of the free end and outputting a detection signal, and
    a circuit or processor configured to control a speed of said electric drive between zero and an electric drive maximum or service speed,
    said circuit or processor being operably connected to said sensor arrangement and in receipt of said detection signal, and
    said circuit or processor being configured to ramp up the speed of said electric drive in response to a detected manual movement with said ramp up starting at a speed above zero and below said maximum or service speed.

2. The screening device according to claim 1, wherein said circuit or processor is configured to stop the electric drive after said ramp up when either reaching a preprogrammed position or detecting that resistance exceeds a threshold.

3. The screening device according to claim 2, wherein said preprogrammed position is an end position.

4. The screening device according to claim 1, wherein said circuit or processor is configured to gradually ramp up the speed of the electric drive starting at a speed well below said electric drive maximum or service speed.

5. The screening device according to claim 1, wherein said circuit or processor is configured to gradually ramp up the speed of the electric drive starting at a speed substantially 10 to 20% of the electric drive maximum or service speed.

6. The screening device according to claim 1, wherein said circuit or processor is configured to smoothly transition from a manual movement to an electrically powered movement by gradually ramping up the speed of the electric drive starting from substantially the same speed as a detected speed of the manual movement at the moment of taking over from the manual movement.

7. The screening device according to claim 6, wherein said sensor arrangement is configured to determine the detected speed of the manual movement and wherein said circuit or processor is configured to gradually ramp up the speed of the electric drive with an acceleration at a moment of taking over from the manual movement that is substantially the same as a detected acceleration of the manual movement at or just before the moment of taking over from the manual movement.

8. The screening device according to claim 1, wherein said circuit or processor is configured to smoothly transition from a manual movement to an electrically powered movement by minimizing a speed change of the free end during the take over from the manual movement.

9. The screening device according to claim 1, wherein said circuit or processor is configured to detect resistance by detecting a drop in the speed of the electric drive.

10. The screening device according to claim 1, wherein said circuit or processor is configured to detect resistance by detecting an increase of electrical current used by the electric drive.

11. The screening device according to claim 1, wherein said electric drive comprises an electric motor.

12. The screening device according to claim 11, wherein said electric drive comprises a reduction gear operably coupled to said electric motor, said reduction gear having a ratio between 5:1 and 40:1.

13. The screening device according to claim 12, wherein the ratio of said reduction gear is between 10:1 and 20:1.

14. The screening device according to claim 1, further comprising an arrangement for storing and releasing potential energy for at least partially compensating for changes in potential energy of the screen caused by movement of the screen in a gravitational field.

15. The screening device according to claim 14, wherein said arrangement for storing and releasing potential energy comprises at least one of a resilient element and a counterweight forced to move in the gravitational field in a direction opposite to movement of said free end.

16. A method for operating an electrically and manually adjustable screening device for screening a window, said screening device comprising:
    a screen with a variable length and with a positionable free end, wherein a longitudinal position of said free end determines a length of said screen; and
    an electric drive operably connected to said screen for adjusting the longitudinal position of said free end at a speed between zero and an electric drive maximum or service speed,
    said method comprising:
    detecting a manual movement of the longitudinal position of the screen and outputting a detection signal; and
    upon detecting the manual movement, operating said electric drive to smoothly transition from the manual movement by ramping up the speed of an electric motor in the electric drive from a portion of the electric drive maximum or service speed to said electric drive maximum or service speed with the ramp up starting at a speed above zero and below said electric drive maximum or service speed.

17. The method of claim 16, wherein operating the electric drive to smoothly transition from the manual movement to an electrically powered movement comprises gradually ramping up the speed of the electric motor in the electric drive starting at a speed substantially equal to a detected speed of the manual movement at the moment of taking over from the manual movement.

18. An electrically and manually adjustable screening device for screening a window,
the screening device comprising:
a screen with a variable length and with a positionable free end, wherein a longitudinal position of the free end determines a length of the screen,
an electric drive operably connected to the screen for adjusting the longitudinal position of the free end,
a sensor arrangement configured for detecting manual movement of the longitudinal position of the free end and outputting a detection signal, and
a circuit or processor configured to send a speed signal to the electric drive to control a speed of the electric drive between zero and an electric drive maximum or service speed,
wherein the circuit or processor is operably connected to the sensor arrangement and in receipt of the detection signal, and
wherein the circuit or processor is configured to send the speed signal to the electric drive to control the speed and smoothly transition from a manual movement to an electrically powered movement by ramping up the speed of the electric drive in response to a detected manual movement with the ramp up starting at a speed above zero, below the maximum or service speed, and at a speed substantially equal to a detected speed of the detected manual movement.

19. The screening device of claim 18, wherein the sensor arrangement is configured to determine the detected speed of the detected manual movement and wherein the circuit or processor is configured to send the speed signal to the electric drive to smoothly transition from the manual movement to an electrically powered movement by gradually ramping up the speed of the electric drive with an acceleration that is substantially the same as a detected acceleration of the detected manual movement.

20. The screening device of claim 18, wherein the circuit or processor is configured to send the speed signal to the electric drive to smoothly transition from the manual movement to an electrically powered movement by minimizing a speed change of the free end during the transition from the manual movement to the electrically powered movement.

* * * * *